United States Patent
Koyama

[11] Patent Number: 5,936,698
[45] Date of Patent: Aug. 10, 1999

[54] MANUFACTURING A DISPLAY DEVICE USING ANODIZATION

[75] Inventor: Jun Koyama, Kanagawa, Japan

[73] Assignee: Semiconductor Energy Laboratory Co., Ltd., Kanagawa-ken, Japan

[21] Appl. No.: 08/631,844

[22] Filed: Apr. 12, 1996

[30] Foreign Application Priority Data

Apr. 14, 1995 [JP] Japan .................................. 7-113572

[51] Int. Cl.⁶ ............................ G02F 1/13; G02F 1/1345; G02F 1/136
[52] U.S. Cl. ....................... 349/187; 349/149; 349/151; 349/46
[58] Field of Search .................. 349/151, 149, 349/187, 46

[56] References Cited

U.S. PATENT DOCUMENTS

| | | | |
|---|---|---|---|
| 4,282,543 | 8/1981 | Ihara et al. ............................... | 357/54 |
| 4,727,044 | 2/1988 | Yamazaki ................................ | 437/45 |
| 5,289,030 | 2/1994 | Yamazaki et al. ...................... | 257/410 |
| 5,521,107 | 5/1996 | Yamazaki et al. ...................... | 437/42 |
| 5,686,328 | 11/1997 | Zhang et al. ........................... | 437/41 |
| 5,729,308 | 3/1998 | Yamazaki et al. ...................... | 349/39 |

*Primary Examiner*—Rodney Bovernick
*Assistant Examiner*—Tarifur R. Chowdhury
*Attorney, Agent, or Firm*—Fish & Richardson P.C.

[57] ABSTRACT

In an active matrix liquid crystal display device, gate lines in thin-film integrated circuits constituted of thin-film transistors are formed with aluminum. In forming the gate lines, before patterning a starting film of the gate lines, slits are formed in regions where hillock and whiskers, if they should occur, would cause crosstalk or short-circuiting, and portions of the gate lines within the slits are anodized. Wiring lines are formed by utilizing the regions where the slits were formed. As a result, there can be solved problems that undesired stress would otherwise occur during anodization and that currents large enough for anodization could not be supplied due to a complex wiring pattern. Gate lines in a pixel area are subjected to a separate anodization step.

12 Claims, 8 Drawing Sheets

MANUFACTURING A DISPLAY DEVICE USING ANODIZATION

BACKGROUND OF THE INVENTION

1. Field of the Invention

The present invention relates to an active matrix liquid crystal display device having an integrated circuit that uses metal electrodes and metal wiring lines. The invention also relates to a display device in which a pixel area having a matrix structure and driver circuits for driving switching elements which are arranged in the pixel area are formed monolithically.

2. Description of the Related Art

There are known active matrix liquid crystal display devices, which are characterized in that a number of pixels are arranged in a matrix of several hundred by several hundred in a pixel area, and a thin-film transistor is provided for each pixel to control charge entering or exiting the pixel electrode.

At present, driver circuits for driving the thin-film transistors arranged in the pixel area are constituted as an external IC circuit. The external IC circuit is formed on a single crystal wafer, because the peripheral driver circuits need transistor circuits having superior characteristics.

On the other hand, as a next-generation active matrix liquid crystal display device, there is now needed a configuration in which peripheral driver circuits and a pixel area are integrated on the same substrate (usually a glass substrate). In this case, it is necessary to constitute the peripheral driver circuits by using thin-film transistors formed on the glass substrate.

Further, in the active matrix liquid crystal display device incorporating the peripheral driver circuits in an integral manner, the area occupied by the peripheral driver circuits should be made as small as possible to minimize the area other than the pixel area.

Such reduced dimensions in design rules makes it more difficult to form wiring lines. Further, as the degree of miniaturization increases, the resistance of wiring lines themselves comes to be unnegligible. Therefore, it is necessary to use materials having as small a resistance as possible to form wiring lines, such as aluminum and a material mainly made of aluminum.

However, formation of wiring lines with a metal material mainly made of aluminum is associated with problems of deformation in wiring line shape and formation of a wiring line having an unintended shape due to abnormal growth of an aluminum component: hillocks, whiskers, and the like.

Hillocks and whiskers may be caused, for instance, by heating during film deposition, heating during resist ashing (i.e., resist removal by oxygen plasma), and heating due to illumination with laser light for annealing.

A hillock occurs due to abnormal growth of aluminum. More specifically, when partial abnormal growth of an aluminum component occurs, growing portions collide with each other to cause a mountainous protrusion. A whisker is a thorn-like or horn-like protrusion caused by abnormal growth of aluminum. While an exact cause of hillocks and whiskers is not known, it is believed to be a certain impurity in aluminum or non-uniformity in the aluminum crystal structure.

Since a hillock and a whisker develop over more than several micrometers, they may cause a serious problem in forming an integrated circuit in which wiring lines and elements are integrated at intervals of several micrometers.

As a method for preventing hillocks and whiskers, a very small amount of rare earth element, silicon, or some other element is mixed into aluminum. However, even with this method, hillocks and whiskers still occur when heated at a temperature higher than about 400° C.

Further, as in the case of gate lines, it is increasingly required that aluminum wiring lines be formed at an early stage of a process. The problem of hillocks and whiskers is more serious in this case, because aluminum wiring lines are necessarily subjected for a longer time to heating steps and steps such as ion implantation which unavoidably involve heating.

Hillocks and whiskers are problematic because they may short-circuit wiring lines which are adjacent to each other vertically or horizontally. This problem becomes conspicuous as dimensions of design rules and wiring line pitches are reduced. In particular, if the wiring line pitch is shorter than 2 μm, hillocks and whiskers in the lateral direction more likely cause short-circuiting between wiring lines adjacent to each other vertically or horizontally.

At a location where wiring lines cross each other, the upper wiring line needs to be formed over the lower wiring line through an interlayer insulating film (for instance, a silicon oxide film). In this case, if the interlayer insulating film does not provide proper step coverage, the upper wiring line may have a stepped disconnection or a local increase in resistance. Where an interlayer insulating film is deposited after formation of a wiring line made only or mainly of aluminum and then a second-layer wiring line is formed, hillocks and whiskers that unavoidably occur as described above deteriorate the step coverage of the interlayer insulating film. As a result, the second-layer wiring line, which is formed on the interlayer insulating film, has such problems as a stepped disconnection.

To solve this problem, a technique has been proposed in which an anodic oxide coating is formed on exposed surfaces of an aluminum wiring line by performing anodization with the aluminum wiring line used as the anode. For example, where a material made only or mainly of aluminum is used as a wiring material, hillocks and whiskers can be prevented by forming an oxide film of the material made only or mainly of aluminum on the top and side surfaces of a wiring line.

However, to perform anodization, it is necessary that a wiring line pattern which is different from that of an intended circuit be formed to allow currents to flow through all the wiring lines, and etching be conducted after the anodization to obtain an intended wiring line pattern. This procedure is not preferable because of an increased number of manufacturing steps. In particular, this re-patterning is not preferable in terms of production yield, because it likely causes etching of unnecessary portions since it is conducted after formation of the wiring lines of the intended circuit.

Further, as dimensions of design rules are reduced and wiring lines become thinner accordingly, stress which is imparted during anodization more frequently causes a defect mode where wiring lines are deformed or disconnected. This problem becomes conspicuous particularly in a case where wiring lines are complex in shape.

In addition, as dimensions of design rules are reduced and wiring lines become thinner accordingly, there come to appear influences of voltage drops in anodization which are caused by the resistance of wiring lines. That is, the voltage drops cause differences in the thickness of anodic oxide films formed.

This problem can be solved by making the cross-section of wiring lines larger than a necessary one, to thereby reduce voltage drops of the wiring lines during anodization. However, the increased cross-section of the wiring lines is an obstruction to increasing the degree of circuit integration.

The anodization technique can prevent hillocks and whiskers in forming wiring lines and electrodes made only or mainly of aluminum. However, on the other hand, it causes various problems as described above. Although there are conductive materials (for instance, tantalum) other than aluminum which can be anodized, the above problems still exist even with the use of such materials.

SUMMARY OF THE INVENTION

An object of the present invention is to provide a technique of suppressing, by utilizing an anodization technique, occurrence of hillocks and whiskers that would otherwise occur in forming wiring lines and electrodes by using a material made only or mainly of aluminum. Further, it is intended to provide a technique of solving the above problems associated with the use of anodization in forming wiring lines by using one of a wide range of materials that can be anodized. In particular, it is intended to provide a technique that effectively utilizes an anodization technique in manufacture of an active matrix display device in which peripheral driver circuits and a pixel area are formed monolithically.

For example, it is intended to provide a technique that effectively utilizes an anodization technique in manufacture of an active matrix liquid crystal display device in which peripheral driver circuits and a pixel area are formed monolithically on a glass substrate.

According to the invention, there is provided a manufacturing method of a display device in which a liquid crystal is interposed between first and second transparent substrates and a pixel area and peripheral driver circuit area are integrated on the first transparent substrate, said method comprising the steps of:

depositing a film that can be anodized;

forming slits in predetermined regions of the film at least in the peripheral driver circuit area, and, at the same time, separating the film into two parts respectively occupying the peripheral driver circuit area and the pixel area;

performing anodization in an electrolyte with the part of the film in the peripheral driver circuit area used as an anode;

patterning the film to form wiring lines that are commonly connected to gate lines in the pixel area;

performing anodization in an electrolyte with the part of the film in the pixel area used as an anode;

performing anodization with the gate lines in the pixel area used as an anode by utilizing the wiring lines commonly connected to the gate lines;

charging a liquid crystal material between the first and second transparent substrates; and cutting the wiring lines commonly connected to the gate lines so that they are separated from the gate lines in the pixel area.

In the above manufacturing method, the film that can be anodized may be made only or mainly of aluminum. Alternatively, tantalum and like elements may be used. However, if the material resistance is taken into consideration, a material made only or mainly of aluminum is most desirable.

In the above manufacturing method, if regions having a higher integration density than the other regions are selected as the predetermined regions where the slits are formed, the advantages of forming the slits are maximized.

By performing anodization with slits formed only in necessary regions before the wiring line patterning, there can be prevented non-uniformity in the thickness of anodic oxide films formed and occurrence of stress.

The reason why non-uniformity in the thickness of anodic oxide films is prevented is that since anodization is performed in the state that slits are formed in portions of the starting film for wiring lines (most of the film remains as it is), voltage drops caused by currents flowing during anodization are almost negligible.

The reason why stress does not occur is that since anodization is performed in the state that slits are formed in particular portions of the film rather than after formation of a pattern of complex, thin wiring lines, stress causes no problems.

By performing anodization under different conditions for wiring lines in the peripheral driver circuits and those in the pixel area, anodic oxide films that are thin but can suppress occurrence of hillocks and whiskers can be formed in the peripheral driver circuits and anodic oxide films that are thick enough to allow formation of offset gate regions can be formed in the pixel area. With this manufacturing process, in the peripheral driver circuits, failures due to occurrence of stress during formation of thick anodic oxide films can be reduced (a case of forming finer pattern and forming thicker anodic oxide films are more susceptible to stress). Further, a necessary off-current characteristic can be obtained in the pixel area.

DETAILED DESCRIPTION OF THE PREFERRED EMBODIMENTS

Embodiment 1

This embodiment is directed to a technique in which in a manufacturing process of an active matrix liquid crystal display device incorporating peripheral driver circuits, thin anodic oxide films are formed partially in the peripheral driver circuits which are required to be highly integrated and thick anodic oxide films to be used to form offset gate regions are formed in the pixel area where a low off-current characteristic is needed.

Figure 6:
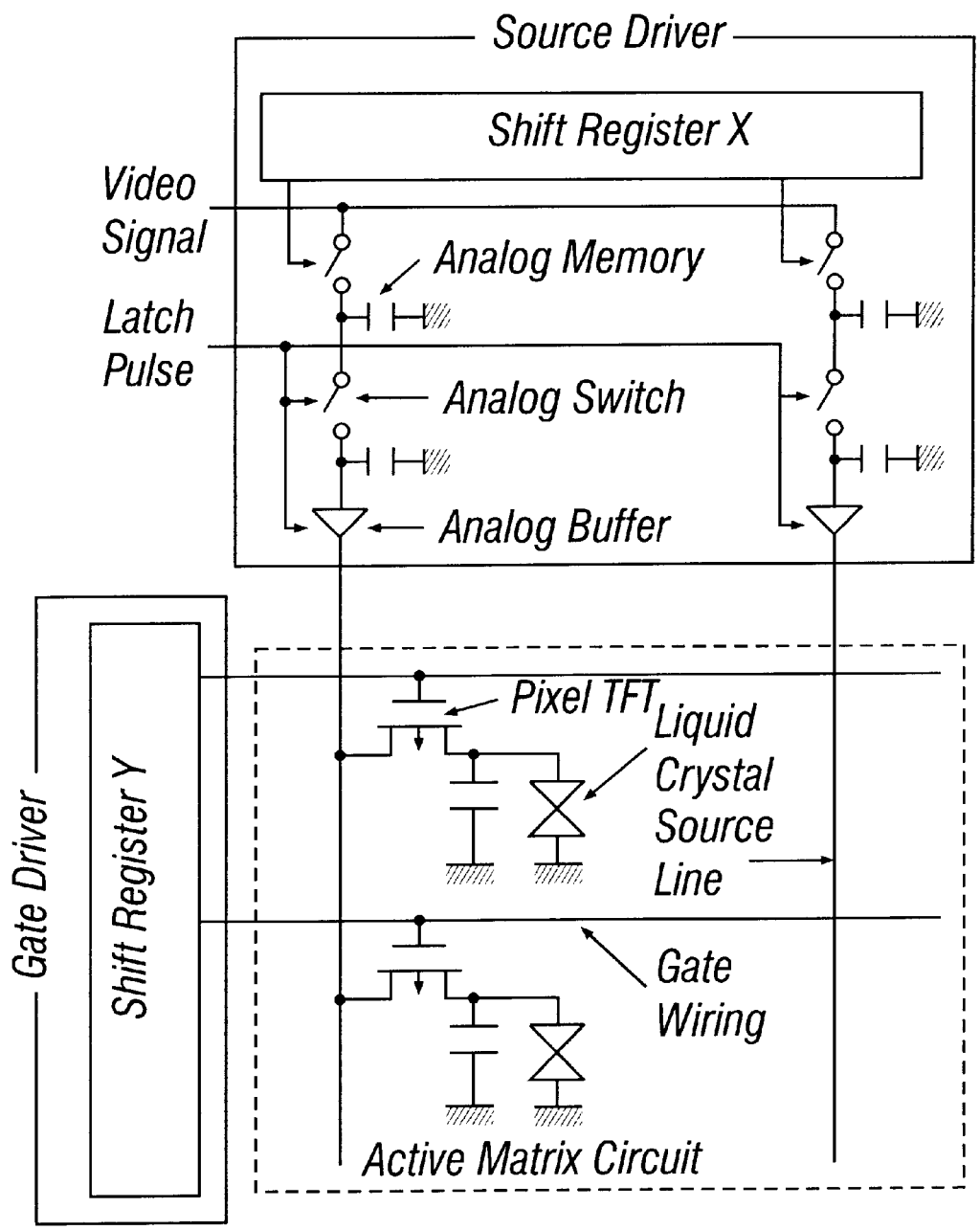
FIGS. 6 and 7 show a general configuration of an active matrix liquid crystal display device.

FIG. 6 is a block diagram showing the configuration of an active matrix liquid crystal display device with which this embodiment is concerned. In this active matrix liquid crystal display device, a pixel thin-film transistor (pixel TFT) is provided for each of pixels which are arranged in matrix form. A source driver circuit and a gate driver circuit are arranged as the peripheral driver circuits for driving the pixel thin-film transistors.

The pixel area and the peripheral driver circuits are monolithically formed on the same glass substrate. Peripheral driver circuit area are as narrow as several millimeters, and are integrated at a high density.

Figure 7:
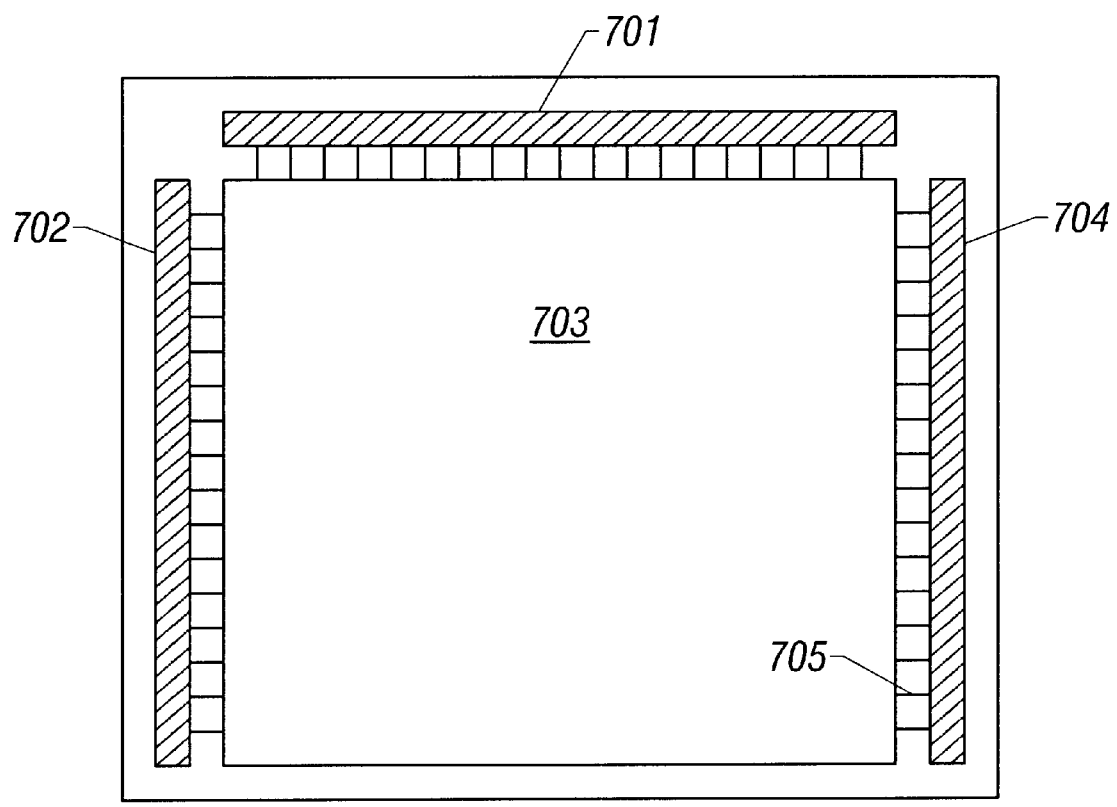

FIG. 7 shows a layout of the active matrix liquid crystal display device of FIG. 6. In FIG. 7, reference numerals 701–703 denote the source driver circuit, the gate driver circuit, and the pixel area, respectively.

Reference numeral 704 denotes a short ring, which is a wiring pattern commonly connected to all the gate lines during manufacture of the device. The short ring 704 is formed at the same time as the gate lines. During the manufacturing process, the short ring 704 serves to short-circuit the gate lines, that is, to equalize the potentials of the gate electrodes of several hundred thousand pixel thin-film transistors.

In a manufacturing process of thin-film transistors and a panel assembling stage of a liquid crystal display device, it sometimes occurs that a large amount of static electricity is applied to a single thin-film transistor. Since an individual thin-film transistor is very small in size, electrostatic breakdown or a failure may occur therein due to even slight charging. The short ring 704 prevents such events.

Since the short ring 704 becomes unnecessary once the liquid crystal display device is completed, it is separated from the gate electrodes in the final step by laser light illumination. The manufacturing method of this embodiment is characterized in that anodic oxide films are formed around the gate lines of the thin-film transistors which are arranged in the pixel area by using the short ring 704.

Figure 1A:
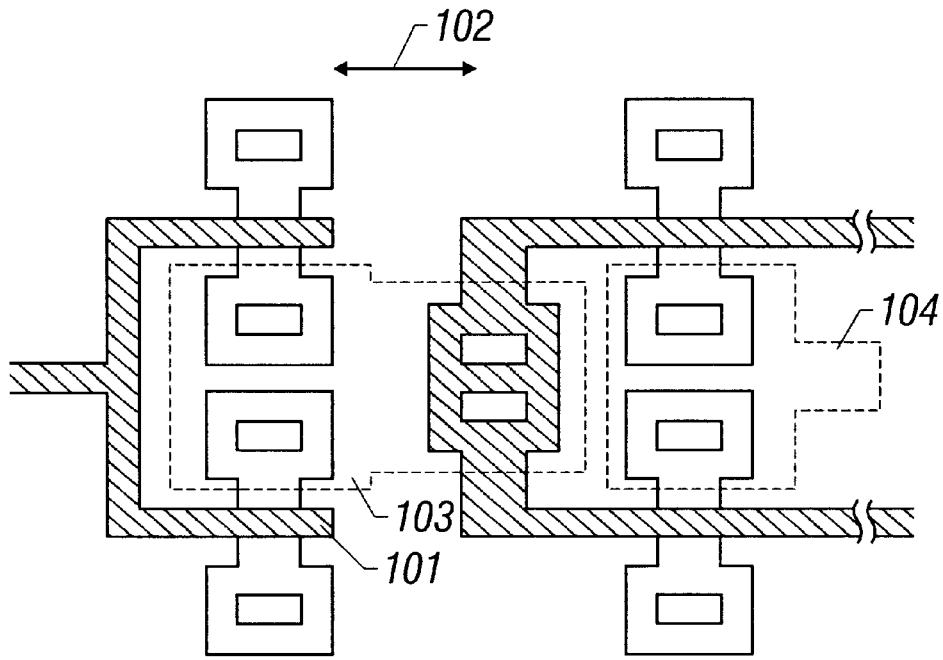
FIGS. 1A and 1B show an example of a thin-film integrated circuit according to a first embodiment of the present invention.
Figure 1B:
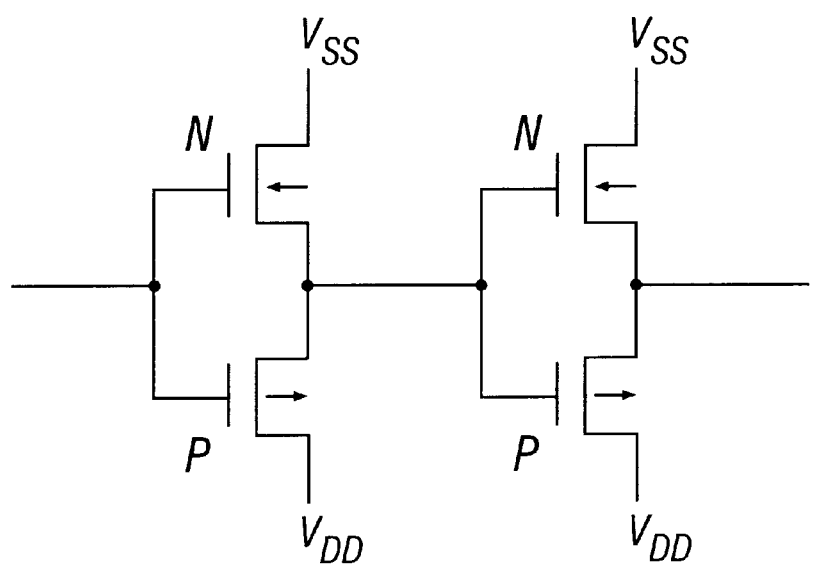

FIGS. 1A and 1B show an example of the analog buffer circuit of FIG. 6. FIGS. 1A and 1B show an example of a basic analog buffer circuit, based on which an actual analog buffer circuit is constituted. FIGS. 1A and 1B specifically show a configuration in which two stages of inverter circuits each being a combination of N-channel and P-channel thin-film transistors are connected to each other in series. This type of inverter circuit is used in a shift-register circuit and other integrated circuits.

FIG. 1B is a circuit diagram corresponding to FIG. 1A. In the circuit of FIGS. 1A and 1B, reference numeral 101 denotes gate lines (hatched in FIG. 1A; extended portions constitute gate electrodes). Reference numeral 103 denotes a wiring line connecting the output of the first-stage inverter circuit and the input of the second-stage inverter circuit. The wiring lines 103 is a second-layer wiring line formed on an interlayer insulating film (not shown) which is formed on the gate lines 101. For convenience of description, the wiring lines 101 are called first-layer wiring lines, and the wiring line 103 is called the second-layer wiring line.

In general, an interlayer insulating film is thicker than 5,000 Å. Therefore, the gate lines 101 (first-layer wiring lines) and the wiring line 103 (second-layer wiring line) are vertically separated from each other with a gap of more than 5,000 Å through the interlayer insulating film.

FIGS. 2A–2B to FIGS. 5A–5B and FIGS. 8A–8C show a manufacturing process of the thin-film transistors of FIGS. 1A and 1B, as well as a manufacturing process of a thin-film transistor in the pixel area. This embodiment is directed to the case of using a glass substrate. In general, a glass substrate or a quartz substrate is used in a liquid crystal electro-optical device, because the substrate should be transparent.

First, a silicon oxide film as an undercoat film is deposited on a glass substrate (not shown in FIGS. 2A and 2B), and an amorphous silicon film (not shown) is deposited thereon by plasma CVD or low-pressure thermal CVD. For example, the undercoat film and the amorphous silicon film are 3,000 Å and 500 Å in thickness, respectively. The amorphous silicon film is then crystallized by heating or laser light illumination, or a combination thereof.

Figure 2A:
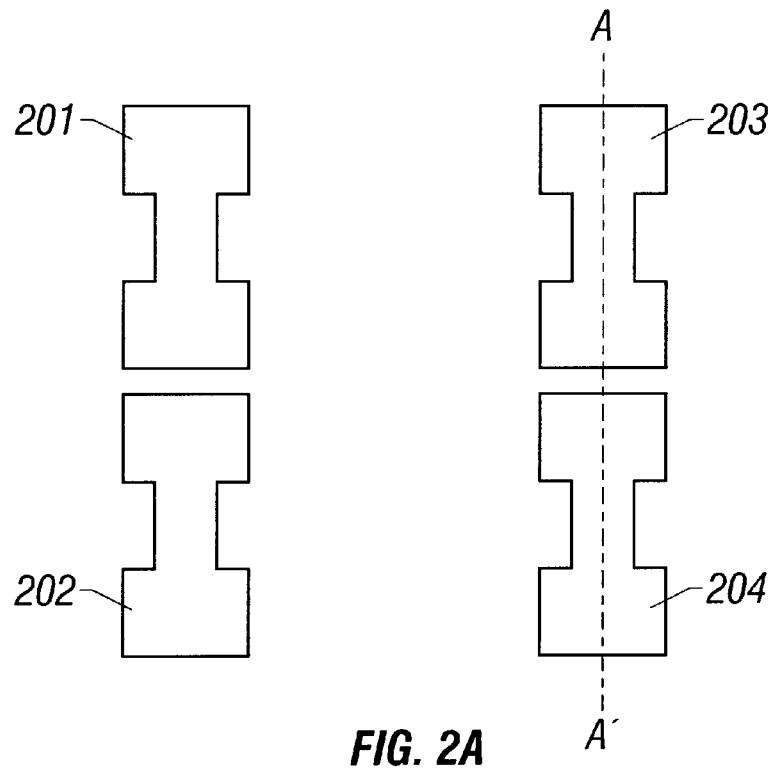
FIGS. 2A–2B, FIGS. 3A–3B, FIGS. 4A–4D, and FIGS. 5A–5B show a manufacturing process of the thin-film integrated circuit according to the first embodiment of the invention.
Figure 8A:
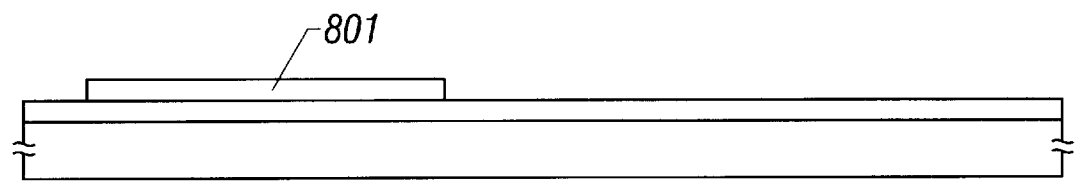
FIGS. 8A–8C show a manufacturing process of a pixel thin-film transistor according to the first embodiment of the invention.

Then, as shown in FIG. 2A, island-like regions 201–204 to become active layers of thin-film transistors are formed by patterning the crystalline silicon film. The patterning may be performed by a known photolithographic process. That is, the island-like regions 201–204 may be formed by forming a resist mask and then removing unnecessary portions of the crystalline silicon film by wet etching or dry etching. At the same time as this step, an active layer 801 of a pixel thin-film transistor is formed as shown in FIG. 8A.

Figure 4A:
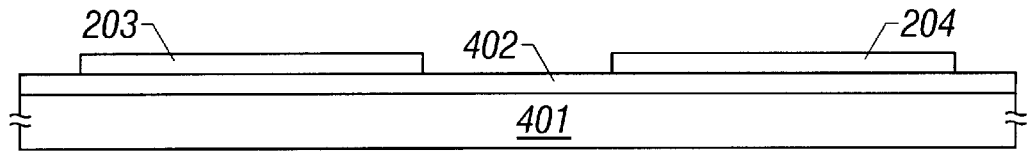

FIG. 4A is a sectional view taken along a broken line A-A' in FIG. 2A. In FIG. 4A, reference numerals 401 and 402 denote the glass substrate and the undercoat silicon oxide film formed thereon, respectively.

Subsequently, a silicon oxide film (not shown in FIGS. 2A and 2B) as a gate insulating film is deposited by plasma CVD or sputtering. The thickness of this silicon oxide film is generally set at 1,000–1,500 Å.

Thereafter, a film mainly made of aluminum, which is to constitute gate electrodes and wiring lines extending therefrom, is deposited by sputtering or electron beam evaporation. The thickness of this film is set at 5,000 Å, for instance.

In this embodiment, the material mainly made of aluminum is a material in which scandium is contained in aluminum at 0.2 wt %. This is to suppress occurrence of hillocks and whiskers as caused by heating or laser light illumination in subsequent steps. Although the mixing of a rare earth element into aluminum can suppress occurrence of hillocks and whiskers, the occurrence of hillocks and whiskers cannot be prevented completely. Silicon may be used instead of the rare earth element.

After the deposition of the film mainly made of aluminum over the entire surface, slits are formed in portions where the occurrence of hillocks or whiskers should be prevented. This is done by forming a resist mask so as to expose the portions where to form slits, and then performing wet or dry etching. In this embodiment, slits are formed in portions 205 which are hatched in FIG. 2B. In this embodiment, the width of the slits 205 may be set at 1–30 μm. This dimension may be determined properly according to design rules applied. The film 206 mainly made of aluminum remains in the whole area where the slits 205 are not formed.

Reference numeral 207 denotes a wiring pattern which will be obtained later by patterning the film 206 mainly made of aluminum (at present the patterning has not been done yet).

Figure 2B:
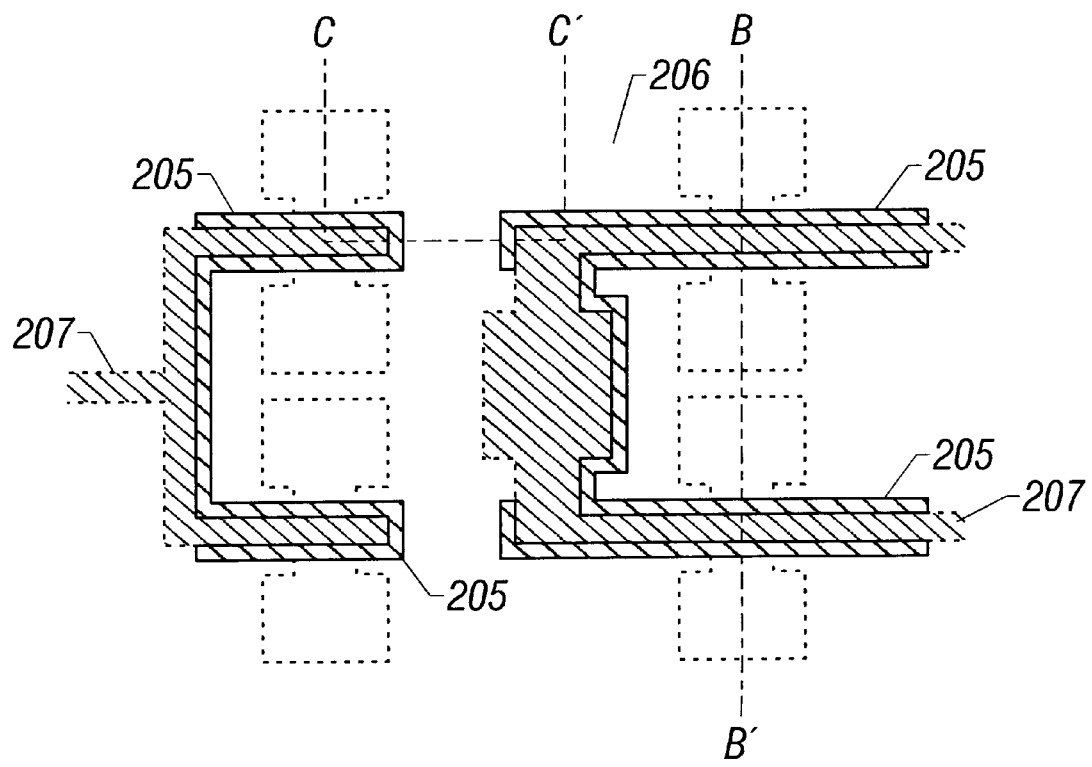

As seen from FIG. 2B, the slits 205 are so formed as to expose side faces of part of the wiring pattern 207, to selectively form anodic oxide films on that part of the wiring pattern 207.

The slits 205 are not formed in regions of the pixel area where to form thin-film transistors. Therefore, in the pixel area, the film 206 mainly made of aluminum exists over the entire surface.

In this state, anodization is performed in an electrolyte with the film 206 mainly made of aluminum used as the anode. In this anodization step, dense anodic oxide films of about 600 Å in thickness are formed on the film 206. In this embodiment, the electrolyte is a solution produced by neutralizing a 3% tartaric acid with ammonia and diluting it with ethylene glycol by a factor of 10. During the anodization, the maximum application voltage is set at 40 V. As a result, there are formed dense, hard anodic oxide films mainly made of $Al_2O_3$.

In this anodization step, the anodic oxide films are also formed in the slits 205. Since the almost entire surface is covered with the film 206 mainly made of aluminum, this anodization step can make the following problems less serious:

deformation of the pattern due to occurrence of stress during the anodization; and non-uniformity in the anodic oxide films due to a voltage drop.

The problem due to the voltage drop can be made less serious, because the regions where the anodic oxide films are formed are not regions of long wiring lines. Ultimately, this enables formation of a fine pattern.

Figure 4B:
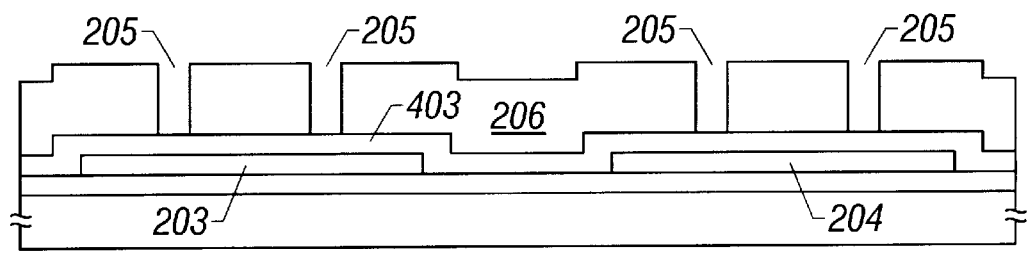

FIG. 4B is a sectional view taken along line B-B' in FIG. 2B. In FIG. 4B, reference numeral 403 denotes the silicon oxide film to serve as a gate insulating film, and 206 denotes the film 206 mainly made of aluminum which will later constitute gate electrodes. Since the film 206 mainly made of aluminum remains in the almost entire area as shown in FIG. 4B, the problems due to occurrence of stress and the voltage drop can be made less serious as described above.

Figure 4C:
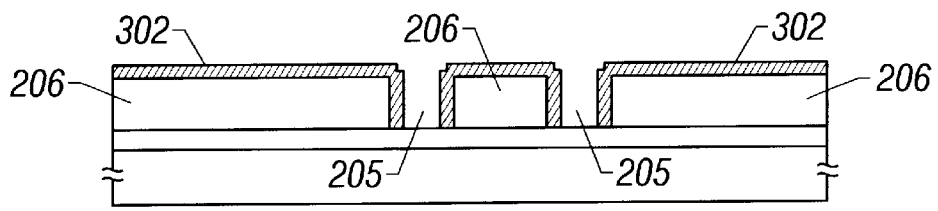

FIG. 4C is a sectional view taken along line C-C' in FIG. 2B. Anodic oxide films 302 produced in the anodization step are shown in FIG. 4C, though they are not shown in FIG. 2B. Reference numeral 205 denote the slits.

After completion of the anodization, the film 206 mainly made of aluminum is patterned to form wiring lines having the intended pattern 207. At the same time as this patterning, gate lines are formed in the pixel area. A short ring 704 is also formed, which is a wiring line connected to all the gate lines. In this state, the gate lines in the pixel area are not connected to the gate driver circuit. That is, when the slits 205 are formed in the above patterning step, the film 206 mainly made of aluminum is separated into two parts respectively occupying the peripheral driver circuit area and the pixel area. This is to perform anodization separately for the respective areas.

The gate lines in the pixel area may be made somewhat thicker in view of the voltage drop during the anodization, because the pixel area need not be so highly integrated as the peripheral driver circuits.

Figure 3A:
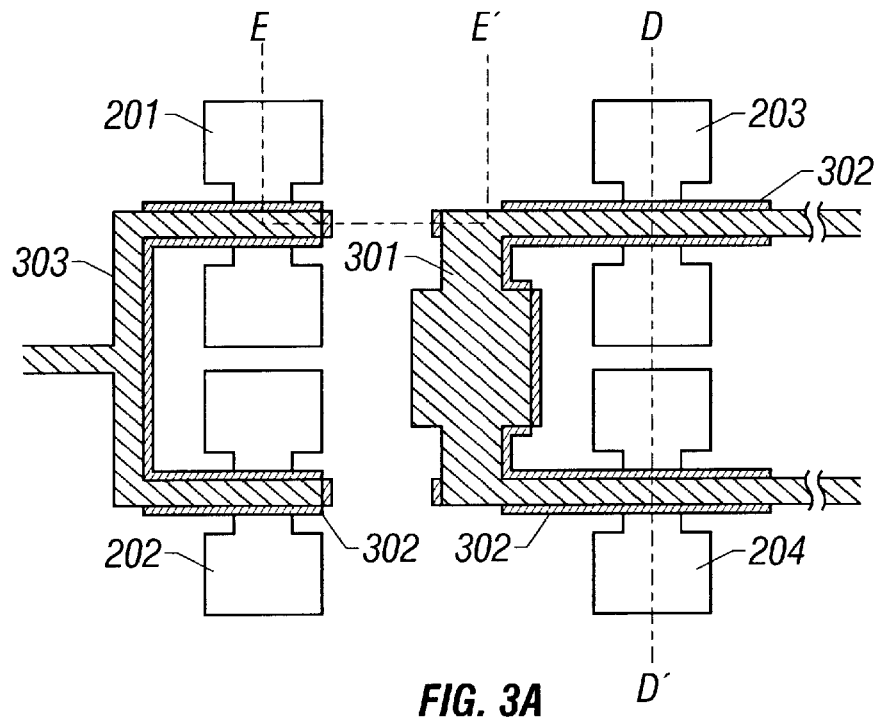

Thus, gate lines 301 and 303 are formed as shown in FIG. 3A. Anodic oxide films 302 are selectively formed on the side faces of the gate lines 301 and 303. Anodic oxide films are also formed on the entire top surfaces of the gate lines 301 and 303. This is the state shown in FIG. 3A.

In this state, anodization is again performed in the same electrolyte as mentioned above by applying a voltage to the short ring 704 shown in FIG. 7. In this anodization step, a relatively high voltage of about 150 V is applied. As a result, anodic oxide films of about 2,000 Å in thickness are formed around the gate lines.

Figure 8B:
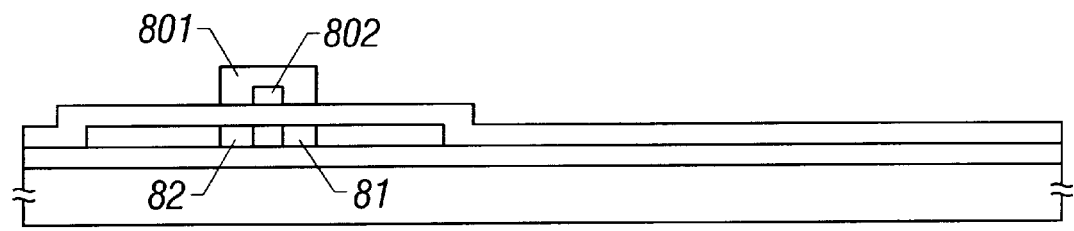

FIG. 8B shows the pixel thin-film transistor in this state. FIG. 8B shows a gate electrode 802 extending from the gate line and an anodic oxide film 803 formed around the gate electrode 802.

Subsequently, phosphorus ions are implanted. Further, boron ions are implanted with the regions 202 and 204 covered with a resist mask. As a result, N-type source/drain regions are formed in the active layers 201 and 203 and P-type source/drain regions are formed in the active layers 202 and 204. N-type source/drain regions are formed in the active layer 801 of the thin-film transistor in the pixel area.

Offset regions can be formed by this impurity ion implantation step, because impurity ions are not implanted into regions 81 and 82 because of the existence of the 2,000Å-thick anodic oxide film 803. By virtue of the formation of the offset gate regions, the off-current of the pixel thin-film transistor can be made small.

After completion of the ion implantation, annealing by laser light illumination is performed to activate implanted ions and repair the active layers that have been damaged by the ion implantation. Thus, the N-channel and P-channel thin-film transistors are formed. That is, two pairs of P-channel and P-channel and N-channel thin-film transistors are formed which are to constitute the inverter circuit shown in FIG. 1B. In the pixel area, N-channel thin-film transistors are formed.

Referring to FIG. 3A, reference numerals 201 and 203 denote the active layers of the N-channel thin-film transistors and numerals 202 and 204 denote the active layers of the P-channel thin-film transistors.

Figure 4D:
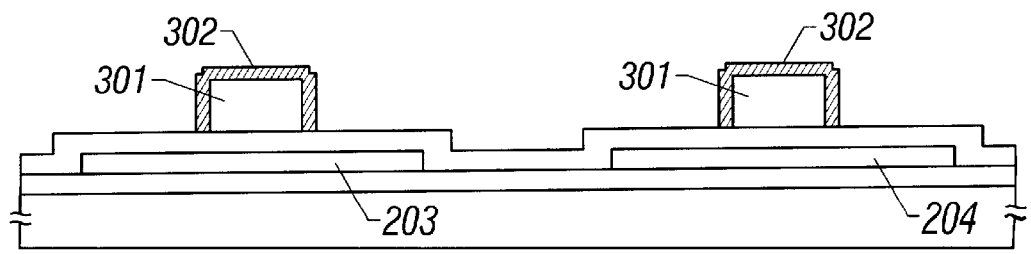

FIG. 4D is a sectional view taken along line D-D' in FIG. 3A.

Although the gate lines are heated during the ion implantation and the laser light illumination described above, no hillocks and whiskers occur in the portions where the anodic oxide films 302 are formed. On the other hand, hillocks and whiskers occur in the portions where the anodic oxide films 302 are not formed.

It is important that the anodic oxide films 302 be formed only in the portions where hillock and whiskers, if they should occur, would possibly short-circuit wiring lines that are adjacent to each other vertically or horizontally.

In the state of FIG. 3A, a silicon oxide film as an interlayer insulating film (not shown in FIGS. 3A and 3B) is deposited at a thickness of about 6,000 Å by plasma CVD so as to cover the gate lines 301 and 303. This silicon oxide film needs to be deposited by a method capable of providing good step coverage.

Figure 3B:
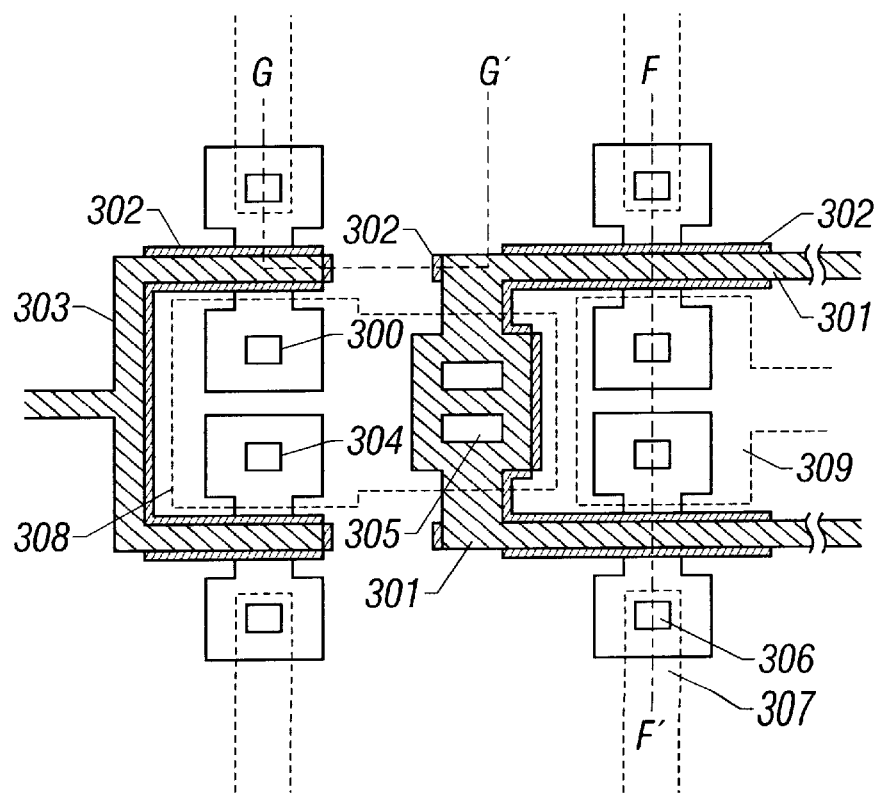

Thereafter, as shown in FIG. 3B, contact holes (for instance, 300 and 304–306) are formed which communicate with the gate line or the source/drain regions of the active layers. The contact holes 300 and 304 communicate with the drain regions of the respective active layer 201 and 202. The contact hole 305 communicates with the gate line 301. The contact hole 306 communicates with the source region of the active layer 204.

Then, a film mainly made of aluminum (not shown in FIGS. 4A–4D) is deposited which is to form second-layer wiring lines. The first-layer wiring lines are gate lines 301 and 303. Second-layer wiring lines (for example, 307–309) are formed by patterning the film mainly made of aluminum.

In FIG. 3B, part of the second-layer wiring lines are denoted by 307–309. The electrode (wiring line) 307 is connected to the source region of the P-channel thin-film transistor. The wiring line 308 contacts with the drain regions of the thin-film transistors that constitute the first-stage inverter circuit via the respective contact holes 300 and 304, as well as the gate line 301. That is, the wiring line 308 connects the output of the first-stage inverter circuit to the input of the second-stage inverter circuit. The wiring line 309 is connected to the output of the second-stage inverter circuit.

The wiring lines 307–309 are connected to the source/drain regions of the thin-film transistors. The wiring lines 307–309 are formed on the interlayer insulating film (not shown), and vertically separated from the gate lines 301 and 303 through the interlayer insulating film.

Figure 5A:
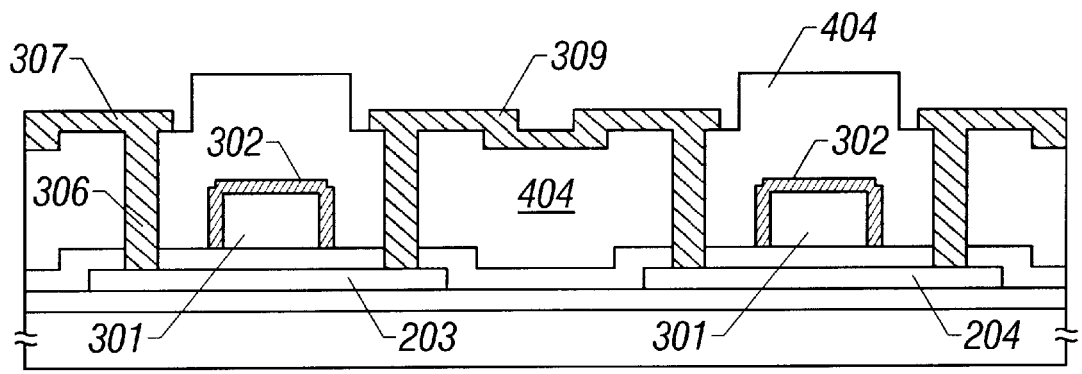
Figure 5B:
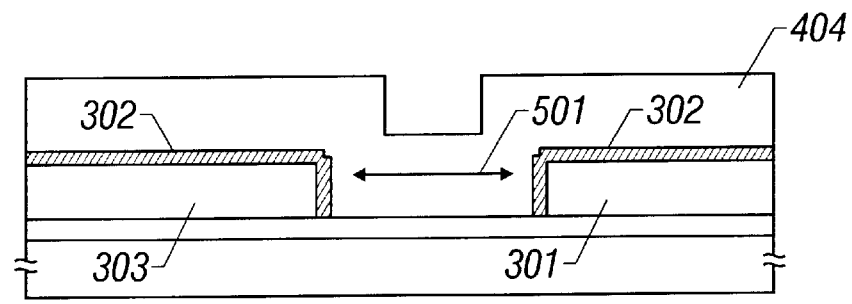

FIG. 5A is a sectional view taken along line F-F' in FIG. 3B, and FIG. 5B is a sectional view taken along line G-G' in FIG. 3B. In FIG. 5A, reference numeral 404 denotes the interlayer insulating film which is a silicon oxide film.

Figure 8C:
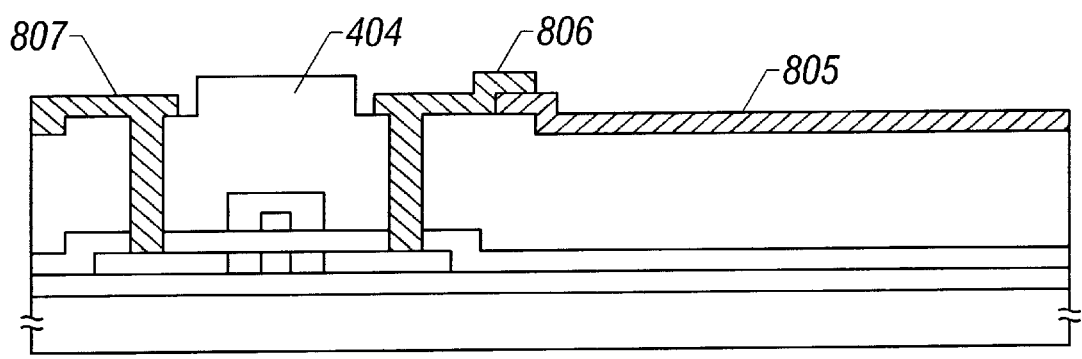

FIG. 8C shows the pixel thin-film transistor in this state. FIG. 8C shows an interlayer insulating film 404 a source electrode 807 (extending from the source line) formed thereon, and a drain electrode 806 which is connected to a pixel electrode 805 made of ITO. The source electrode 807 and the drain electrode 806 are formed at the same time as the second-layer wiring lines by using the same material as the latter.

No hillocks and whiskers occur in the second-layer wiring lines 307–309, because heat treatments or laser light illumination that would cause hillocks and whiskers will not be performed after the formation of the second-layer wiring lines 307–309. A heat treatment in a hydrogen atmosphere after the formation of the second-layer wiring lines is effective in improving the characteristics of the devices. This heat treatment does not cause hillocks in the second-layer wiring lines because it is conducted under conditions of 350° C. and about 1 hour.

Thus, the circuit shown in FIG. 3B is completed, which is equivalent to the circuit shown in FIG. 1A. In the circuit of FIG. 3B, short-circuiting can be prevented from occurring between the gate lines 301 and 303 due to a hillock or a whisker. This is because the anodic oxide films 302 are formed in regions where hillocks and whiskers, if they should occur, possibly short-circuit the gate lines 301 and 303, and therefore no hillocks or whiskers occur in those regions because of the anodic oxide films 302 serving as barriers.

As a result, the first-stage inverter and the second-stage inverter can be disposed closer to each other: a distance 501 (see FIG. 5B) can be shortened. This is important in increasing the degree of integration of an integrated circuit.

The anodic oxide films 302 which are formed on the portions of the gate lines 301 and 303 can also prevent vertical short-circuiting between the gate lines 301 and 303 and the second-layer wiring lines 307–309. This is because when viewed from above or below, the anodic oxide films 302 are formed on the top and side faces of the gate lines 301 and 303 in the regions where they are close to the second-layer wiring lines 307–309. In these regions, since the anodic oxide films 302 suppress occurrence of hillocks and whiskers, the gate lines 301 and 303 and the second-layer wiring lines 307–309 can be prevented from contacting with each other.

For example, where aluminum is used as the material of the gate lines (gate electrodes), hillocks and whiskers would occur on the side faces of the gate line 301 because it is unavoidably heated during impurity ion implantation for formation of the source/drain regions and during laser light illumination or thermal annealing for activation of the source/drain regions. As a result, referring to FIG. 5A, short-circuiting would likely occur between the gate line 301 (first-layer wiring line) and the second-layer wiring line 307 extending in the contact hole 306.

In contrast, with the configuration of this embodiment, the anodic oxide films 302 can suppress occurrence of hillocks and whiskers in the gate line 301 in the cross-section shown in FIG. 5A. Therefore, short-circuiting between the gate line 301 and the second-layer wiring line 307 can be prevented. Further, there can be prevented an event that hillocks and whiskers occurring in the gate wiring line 301 would otherwise make it difficult to form the contact hole 306 or cause a failure of contact between the wiring line 307 and the active layer 203 (in this case, the source region).

The above is also advantageous in reducing the size of thin-film transistors and increasing the degree of integration.

In the state of FIGS. 3B and 8C, a silicon oxide film to become another interlayer insulating film is deposited by plasma CVD. A known reflow film may be used as this interlayer insulating film. An organic resin film as an orientation film is formed thereon. A glass substrate on which an opposed electrode has been formed and the glass substrate 401 on which the above-described circuits have been formed are bonded together, and a liquid crystal is injected between those substrates. Thus, cell assembling of a liquid crystal panel is completed.

Thereafter, connecting portions 705 (see FIG. 7) between the gate lines and the short ring 704 are cut by illumination with YAG laser light. This is done by displacing the two glass substrates from each other to expose the connecting portions 705, and applying YAG laser light to those portions.

The active matrix liquid crystal panel thus manufactured can have a high density. In the peripheral driver circuits, the problems associated with the anodization can be made less serious. At the same time, in the pixel area, offset gate regions can be formed by utilizing the anodization, so that thin-film transistors having a good off-current characteristic can be formed.

Since the connecting portions 705 (see FIG. 7) that were used in forming the pixel thin-film transistors are cut by laser light at the final stage, the number of manufacturing steps is not increased.

Embodiment 2

This embodiment is characterized in that slits are formed also in forming the gate lines of the pixel thin-film transistors in the manufacturing process of the first embodiment. In the first embodiment, anodization is performed twice: the first anodization is performed for the slit portions of the gate lines in the peripheral driver circuits, and the second anodization is performed for the entire gate lines in the pixel area.

In the manufacturing process of the first embodiment, anodic oxide films are formed on the entire gate lines formed in the pixel area. In this case, there is a possibility that in forming a large pixel area, non-uniformity occurs in the thickness of the anodic oxide films due to the voltage drop of the gate lines. This problem will become remarkable when it is attempted to produce a large-area liquid crystal display device such as a 40-inch type or devices even larger than it as the technology advances in the future.

In view of the above, this embodiment is characterized in that the gate lines in the pixel area are also subjected to partial anodization with formation of slits. Anodization is performed twice also in this embodiment.

The manufacturing process of this embodiment has a feature that in forming slits before anodization, a film mainly made of aluminum for formation of gate lines are separated into two parts respectively occupying the peripheral driver circuit area and the pixel area. This allows the two times of anodization steps to be performed separately for those areas.

In the pixel area, slits may be formed in regions where offset gate regions need to be formed. Anodization is performed two times. For example, the first anodization is performed for the peripheral driver circuit area, and the second anodization is performed for the pixel area under different conditions from those of the first anodization. The anodization for the pixel area is performed by supplying currents from the short ring 704. The conditions of the respective anodization steps may be set the same as those of the first embodiment.

By forming the slits only in the necessary portions and performing anodization before the patterning for formation of wiring lines, there can be prevented non-uniformity in the thickness of anodic oxide films due to the voltage drop during anodization and occurrence of stress due to anodization as performed after formation of a fine pattern. Not only the advantages are obtained which result from formation of anodic oxide films around wiring lines and electrodes, but also the problems associated with anodization can be eliminated.

In the manufacturing process of an active matrix display device in which peripheral driver circuits and a pixel area are formed monolithically, the degree of integration can be increased easily by utilizing an anodization technique in formation of the peripheral driver circuits. The degree of integration of circuits can be increased particularly when wiring lines are made of a material that is made only or mainly of aluminum, which material has a low resistance.

Further, by effectively utilizing an anodization technique in forming thin-film transistors in the pixel area, they are allowed to have a small off-current.

What is claimed is:

1. A method of manufacturing a display device comprising the steps of:

forming a conductive film comprising an anodizable material over a substrate;

removing selected portions of said conductive film to form slits in said conductive film;

performing an anodic oxidation with said conductive film as an anode to form an anodic oxide film on an upper surface of said conductive film and side surfaces of said conductive film in said slits; and patterning said conductive film to form a wiring pattern after said anodic oxidation, said patterning leaving a portion of a side surfaces of said wiring pattern being covered with the anodic film which is formed in said anodic oxidation.

2. A method of manufacturing a display device according to claim 1 wherein said wiring pattern includes a gate electrode.

3. A method of manufacturing a display device according to claim 1 wherein said anodizable material is aluminum.

4. A method of manufacturing a display device including an active matrix circuit and a driver circuit for driving said active matrix circuit, both formed over a substrate, said method comprising the steps of:

forming a conductive film comprising an anodizable material over said substrate, said conductive film having a first portion to form a first gate wiring for said driver circuit and a second portion to form a second gate wiring for said active matrix circuit;

forming slits in the first portion of said conductive film by selectively etching said conductive film;

performing an anodic oxidation with said conductive film as an anode to form an anodic oxide film on an upper surface of said conductive film and on side surfaces of said conductive film in said slits; and patterning said conductive film to form said first and second gate wirings after said anodic oxidation, said patterning leaving a portion of side surfaces of said first gate wiring which is covered with the anodic oxide film which is formed in said anodic oxidation.

5. The method according to claim 4 further comprising a step of performing another anodic oxidation only on said second gate wiring.

6. The method according to claim 4 wherein said anodizable material is aluminum.

7. The method according to claim 4 wherein said first portion where said slits are formed have a higher integration density than the second portion.

8. A method of manufacturing a display device including an active matrix circuit and a driver circuit for driving said active matrix circuit, both formed over a substrate, said method comprising the steps of:

forming a conductive film comprising an anodizable material over said substrate, said conductive film having a first portion to form a first gate wiring for said driver circuit and a second portion to form a second gate wiring for said active matrix circuit;

forming slits in the first portion and the second portion of said conductive film by etching said conductive film selectively;

separating said first portion of the conductive film from said second portion of the conductive film at the same time as said forming slits step;

performing a first anodic oxidation in said first portion of the conductive film as an anode to form an anodic oxide film on an upper surface of said first portion of the conductive film and on side surfaces of said first portion of the conductive film in said slits;

performing a second anodic oxidation in said second portion of the conductive film to form an anodic oxide film on an upper surface of said second portion of the conductive film and on side surfaces of said second portion of the conductive film in said slits; and patterning said conductive film to form said first and second gate wirings after said first and second anodic oxidation, said patterning leaving a portion of side surfaces of said first gate wiring and a portion of side surfaces of said second gate wiring being covered with the anodic oxide film which is formed in said first and second anodic oxidation.

9. The method according to claim 8 wherein said anodizable material is aluminum.

10. A method of manufacturing a display device including an active matrix circuit and a driver circuit for driving said active matrix circuit, both formed over a substrate, said method comprising the steps of:

forming a conductive film comprising an anodizable material over said one of two transparent substrates, said conductive film having a first portion to form a first gate wiring for said driver circuit and a second portion to form a second gate wiring for said active matrix circuit;

forming slits in at least a first portion of said conductive film;

separating said first portion of the conductive film from said second portion of the conductive film at the same time as said forming slits step;

performing a first anodic oxidation with said first portion of the conductive film and an anode;

patterning said conductive film to form a wiring line which is connected to said second gate wiring;

performing a second anodic oxidation with said wiring line used as an anode;

injecting a liquid crystal material between said two transparent substrates; and cutting said wiring line so that wiring line is separated from said second gate wiring.

11. The method according to claim 10 wherein said anodizable material is aluminum.

12. The method according to claim 10 wherein a region where said slits are formed have a higher integration density than the other region.

* * * * *